(12) United States Patent
Buchan et al.

(10) Patent No.: US 9,943,950 B2
(45) Date of Patent: Apr. 17, 2018

(54) THREADED PIN REMOVER

(71) Applicant: General Electric Company, Schenectady, NY (US)

(72) Inventors: Charles Van Buchan, Greer, SC (US); Melissa Jones Bush, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 66 days.

(21) Appl. No.: 14/576,745

(22) Filed: Dec. 19, 2014

(65) Prior Publication Data

US 2016/0176031 A1 Jun. 23, 2016

(51) Int. Cl.
| | |
|---|---|
| *B25B 27/14* | (2006.01) |
| *B25B 23/10* | (2006.01) |
| *B25B 27/02* | (2006.01) |
| *B25B 13/44* | (2006.01) |
| *B23B 31/20* | (2006.01) |
| *B25C 11/02* | (2006.01) |

(52) U.S. Cl.
CPC .......... *B25B 27/143* (2013.01); *B23B 31/207* (2013.01); *B25B 13/44* (2013.01); *B25B 23/103* (2013.01); *B25B 27/023* (2013.01); *B25C 11/02* (2013.01)

(58) Field of Classification Search
CPC ... B25B 27/026; B25B 27/023; B25B 27/064; B25B 27/14; B25B 27/143
See application file for complete search history.

(56) References Cited

U.S. PATENT DOCUMENTS

| | | | | |
|---|---|---|---|---|
| 1,581,057 A | | 4/1926 | Hill | |
| 1,583,554 A | * | 5/1926 | Hoover | B25B 23/103 279/58 |
| 1,807,265 A | * | 5/1931 | Walker | B25B 23/103 269/7 |
| 2,390,034 A | * | 11/1945 | Walker | B25B 23/103 81/112 |
| 2,434,354 A | * | 1/1948 | Emmons | B25B 23/103 81/112 |
| 2,435,137 A | * | 1/1948 | Geertsema | B25B 23/103 81/113 |
| 2,497,214 A | * | 2/1950 | Dreyer | B25B 23/103 81/113 |
| 2,617,181 A | | 11/1952 | D'Haem | |

(Continued)

*Primary Examiner* — Christopher M Koehler
*Assistant Examiner* — Seahee Yoon
(74) *Attorney, Agent, or Firm* — Ernest G. Cusick; Hoffman Warnick LLC

(57) ABSTRACT

A threaded pin remover for a threaded pin in an interference fit in a structure is provided. The threaded pin remover includes a housing. A pin grasper is slidably mounted in the housing and includes: a first end configured to couple to a linear actuator for slidably moving the pin grasper between an extended position relative to the housing and a retracted position relative to the housing. A second end of the pin grasper includes a pin grasping collet configured to, in the retracted position relative the housing, engage with a portion of the housing to cause grasping of the exposed portion of the threaded pin by the pin grasping collet to release the threaded pin from the interference fit, allowing removing of the threaded pin from the structure.

18 Claims, 7 Drawing Sheets

(56) References Cited

U.S. PATENT DOCUMENTS

| | | | | |
|---|---|---|---|---|
| 2,639,887 A * | 5/1953 | Henry | B25C 11/02 | 254/19 |
| 2,706,103 A * | 4/1955 | Stambaugh | B25C 11/02 | 254/19 |
| 2,719,445 A * | 10/1955 | Giebler | B25B 23/103 | 81/114 |
| 2,767,401 A | 10/1956 | Haberstump | | |
| 2,797,889 A | 7/1957 | Talboys | | |
| 2,916,813 A * | 12/1959 | Belanger | B25B 27/023 | 29/256 |
| 3,339,439 A * | 9/1967 | Dalen | B25B 13/44 | 81/112 |
| 3,529,497 A * | 9/1970 | Brooks | B25B 27/02 | 173/91 |
| 3,735,650 A * | 5/1973 | Weng, Jr. | B25B 27/18 | 81/53.2 |
| 4,187,708 A * | 2/1980 | Champoux | B23P 9/025 | 173/169 |
| 4,513,643 A * | 4/1985 | McKean | B23P 19/04 | 81/53.2 |
| 4,590,826 A * | 5/1986 | McKean | B23P 19/06 | 81/53.2 |
| 4,651,596 A * | 3/1987 | Rachanski | B25B 13/44 | 29/264 |
| 4,819,519 A * | 4/1989 | McKean | B25B 23/103 | 81/53.2 |
| 4,989,442 A * | 2/1991 | Rosier | B21J 15/022 | 29/243.53 |
| 5,138,754 A * | 8/1992 | Casteel | B23P 19/025 | 29/252 |
| 5,806,859 A * | 9/1998 | Saccomanno, III | B23B 31/207 | 279/143 |
| 6,240,811 B1 * | 6/2001 | Oesterle | B25B 13/44 | 81/90.2 |
| 6,951,049 B2 * | 10/2005 | Klann | B25B 27/02 | 29/263 |
| 7,131,175 B2 | 11/2006 | Young | | |
| 7,290,968 B1 * | 11/2007 | Wu | B23B 31/207 | 279/8 |
| 8,720,963 B2 * | 5/2014 | Nguyen | B25B 27/02 | 294/100 |
| 9,056,359 B1 * | 6/2015 | Clark | B25B 27/02 | |
| 2004/0187288 A1 | 9/2004 | Bruehwiler et al. | | |
| 2004/0261241 A1 * | 12/2004 | Crouch | B23B 31/207 | 29/428 |
| 2005/0044684 A1 * | 3/2005 | Haines, Jr. | B21J 15/50 | 29/426.4 |

* cited by examiner

US 9,943,950 B2

THREADED PIN REMOVER

BACKGROUND OF THE INVENTION

The disclosure relates generally to industrial connectors, and more particularly, to a threaded pin remover for removing a threaded pin from an interference fit in a structure.

In a large variety of industrial settings, threaded pins are used to couple structures together. These pins are typically only partially threaded near an exposed end thereof. During mounting, the pin's distal end engages two or more structures to position the parts and maintain their relative position. The proximal end of the threaded pin is partially threaded into an opening in one of the structures and is partially compressed to create an interference fit with the structure, preventing unwanted removal of the threaded pin, e.g., by vibrations of the structure.

Periodically, practically all industrial machines require repair or maintenance, necessitating removal of the threaded pins to gain access to internal structures of the machine. In order to remove the threaded pins, as described, one common approach has an operator screw a threaded tool onto or into an exposed portion of the threaded pin. Once coupled, the threaded pin can be pulled from the structure, breaking the interference fit. In some cases, the threaded pin spins, not allowing engagement so that the threaded pin cannot be removed. Where this situation arises, this type of thread-on tool wastes time and is expensive to operate. In addition, in many instances, the thread-on tool damages the threaded pin such that it cannot be reused, increasing expense of repairs.

BRIEF DESCRIPTION OF THE INVENTION

A first aspect of the disclosure provides a threaded pin remover for a threaded pin in an interference fit in a structure, the threaded pin remover comprising: a housing; a pin grasper slidably mounted in the housing, the pin grasper including: a first end configured to couple to a linear actuator for slidably moving the pin grasper between an extended position relative to the housing and a retracted position relative to the housing, and a second end including a pin grasping collet configured to, in the retracted position relative the housing, engage with a portion of the housing to cause grasping of the exposed portion of the threaded pin by the pin grasping collet to release the threaded pin from the interference fit, allowing removing of the threaded pin from the structure.

A second aspect of the disclosure provides a threaded pin remover for a threaded pin in an interference fit in a structure, comprising: a housing including a body, and a collet engaging sleeve extending from the body; a pin grasper slidably mounted in the housing, the pin grasper including: a connector configured to couple to a linear actuator for slidably moving the pin grasper between an extended position relative to the housing and a retracted position relative to the housing, a pin grasping collet configured to, in the retracted position relative the housing, engage with a portion of the housing to cause grasping of the exposed portion of the threaded pin by the pin grasping collet to release the threaded pin from the interference fit, allowing removing of the threaded pin from the structure, and an adapter coupling the connector to the pin grasping collet.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a threaded pin remover for industrial machines.

Figure 1:
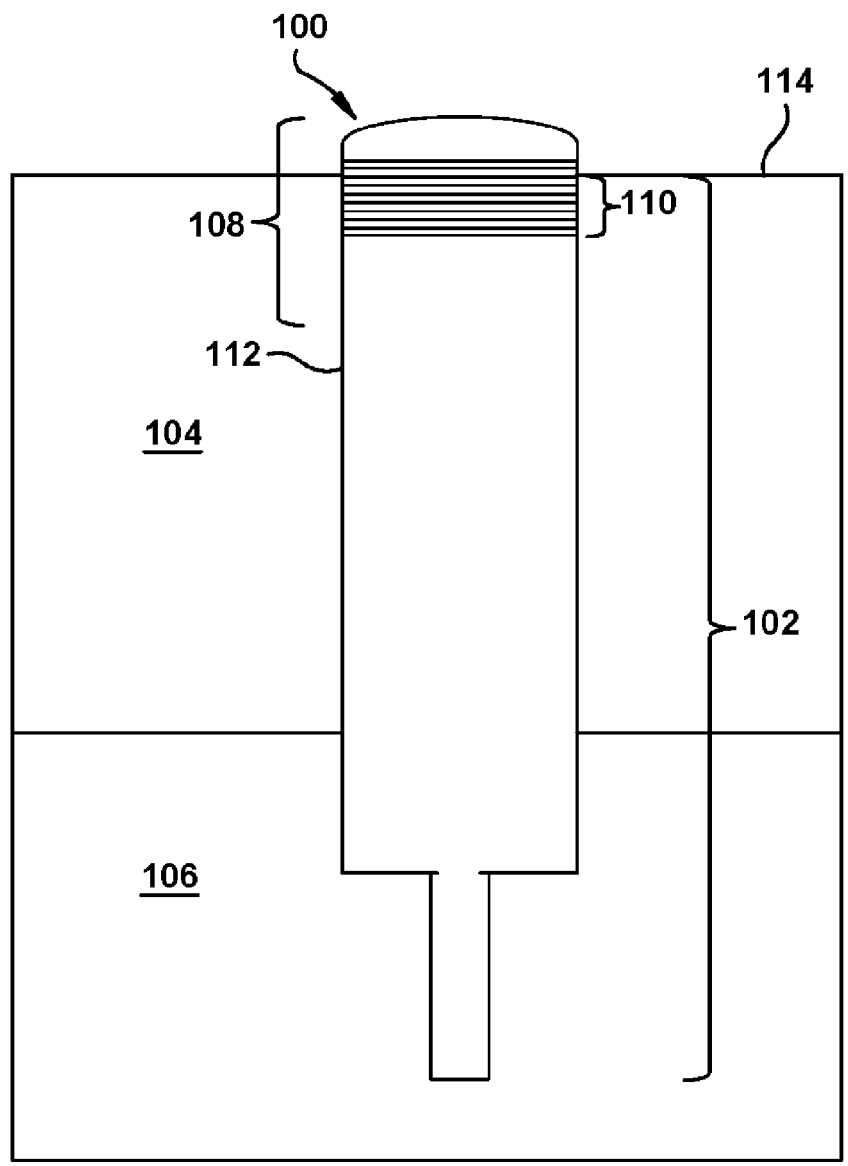
FIG. 1 shows a cross-sectional view of an illustrative threaded pin in a structure.

Referring to FIG. 1, a cross-section of an illustrative threaded pin 100 is shown. As used herein, a "threaded pin" may include a pin body 102 that extends through a number of structures 104, 106 (only two shown, but could be more or less) to couple or align the structures. Structure(s) 104, 106 may be part of any machine. In one embodiment, structures 104, 106 may be part of a shroud tile on shroud blocks of a turbine system. Structures 104, 106 can include any material, e.g., metal, ceramic metal composite (CMC), etc. Threaded pin 100 may be made of any form of metal or alloy and may include a proximal, exposed end 108 that includes a threaded area 110 on the outside thereof. Body 102 may take on any of a large variety of shapes to accommodate the shape and size of openings in structures 104, 106, e.g., opening 112. Threaded area 110 allows for coupling to an immediate structure, e.g., structure 104, in which the proximal end is positioned. An opening 112 in structure 104 typically is void of threads. The threads(s) in area 110 may be helical, allowing screwing engagement between threaded pin 100 and opening 112 in structure 104. Proximal end 108 of threaded pin 100 has also been compressed, e.g., by physical deformation of proximal end 108 sometimes referred to as "staking" or "punching", so as to deform proximal end 108 within opening 112 into an an interference fit with structure 104. In this fashion, while thread area 110 initially couples threaded pin 100 to structure(s) 104, 106, the interference fit prevents unwanted removal of the pin, for example, by vibrations of structures 104, 106.

Figure 2:
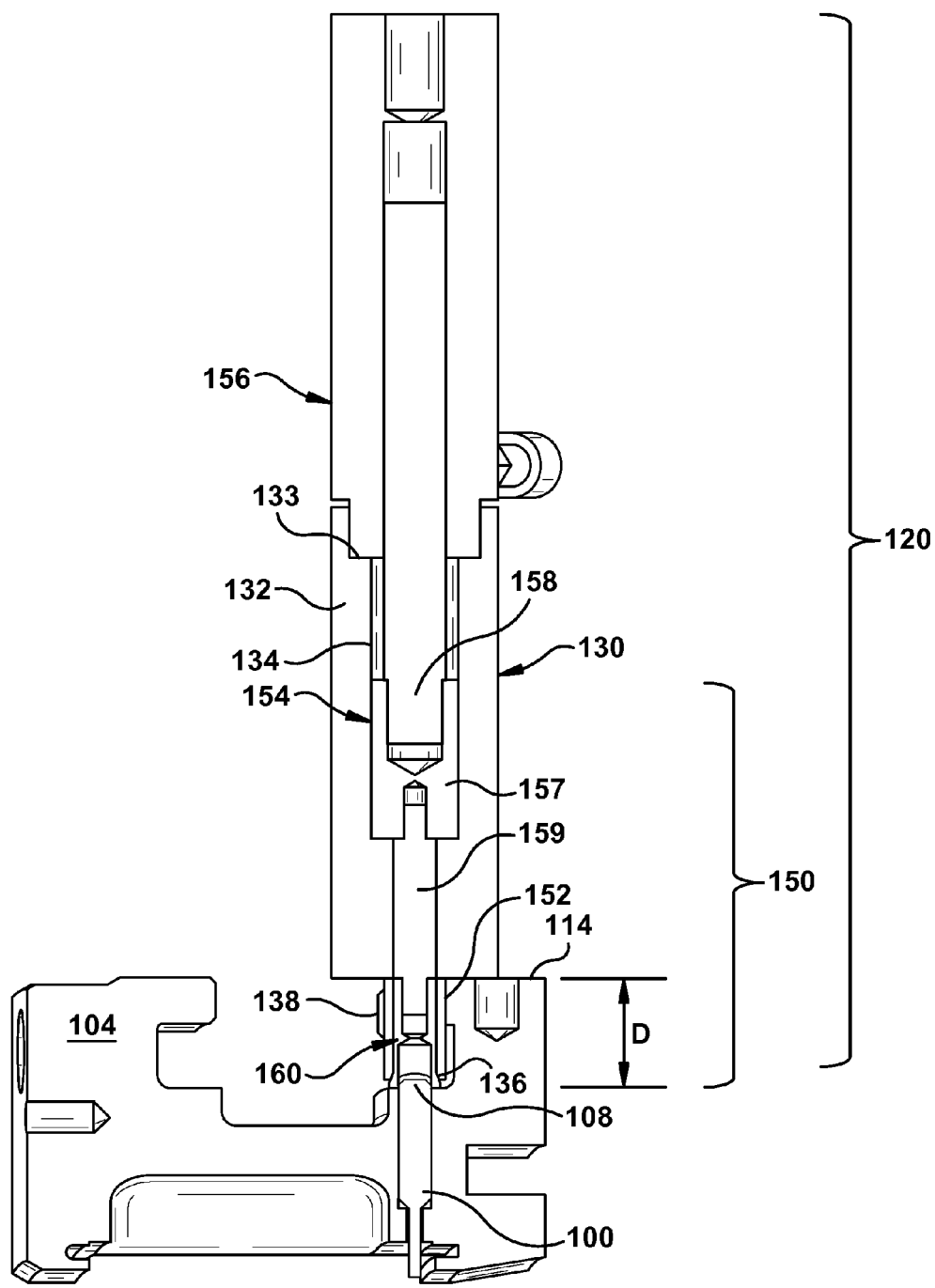
FIG. 2 shows a cross-sectional view of a threaded pin remover according to embodiments of the invention.

Referring to FIG. 2, a cross-sectional view of a threaded pin remover 120 in an operational setting according to embodiments of the invention is shown. Threaded pin remover 120 may generally include a housing 130 and a pin grasper 150 including a pin grasping collet 152 that interacts with housing 130 to engage an exposed portion (e.g., proximal end 108 (FIG. 1)) of threaded pin 100 to release the interference fit and allow removal of the threaded pin.

Figure 3:
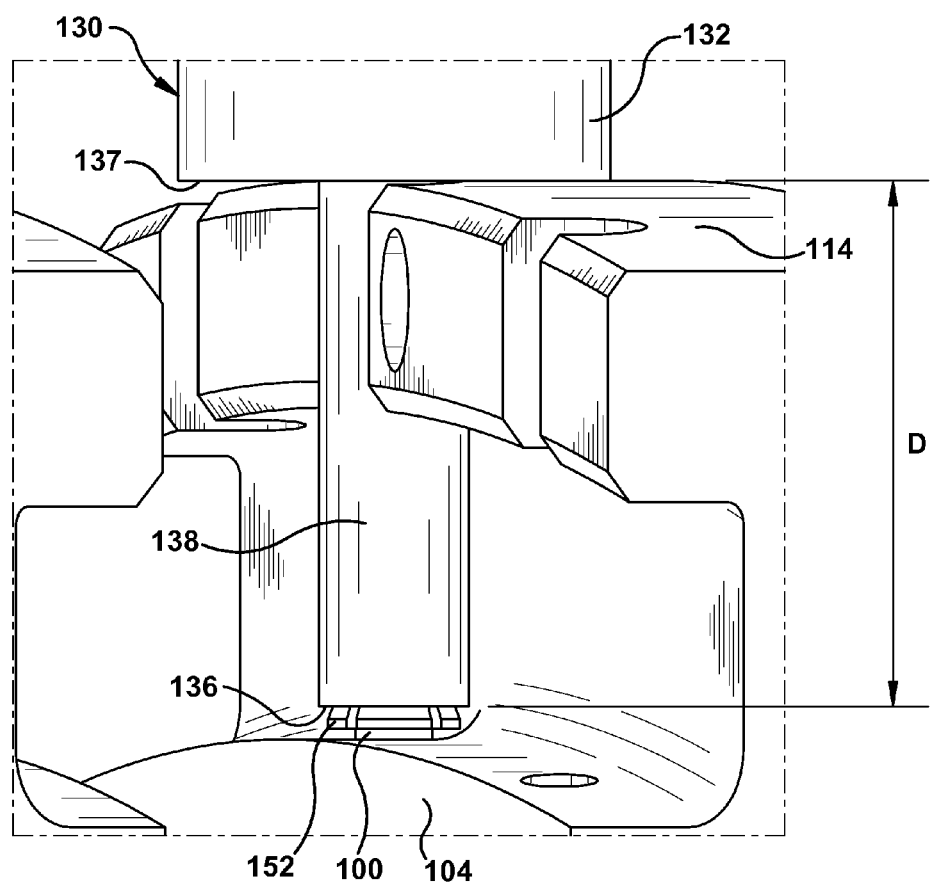
FIG. 3 shows an enlarged, perspective view of one end of the threaded pin remover of FIG. 2.

As shown in FIG. 2, housing 130 may include a body 132 having a central opening 134 extending therethrough. Central opening 134 may have a number of sections for housing different portions of pin grasper 150, as will be described herein. Housing 130 may have different arrangements to accommodate different environments in which threaded pin 100 is employed. In one embodiment, shown in most drawings, housing 130 may also include a collet engaging surface 136 in the form of a collet engaging sleeve 138 extending from body 132 and configured to engage an external surface of pin grasping collet 152, as will be described herein. As illustrated in FIG. 2 and in the enlarged view of FIG. 3, collet engaging sleeve 138 may have a length configured to accommodate a seating distance D of threaded pin 100 relative to a surface 114 of structure 104. That is, sleeve 138 has a length to position pin grasping collet 152 within collet engaging sleeve 138 at a point for grasping exposed proximal end 108 of threaded pin 100. In this setting, although not necessary, in operation, an end 137 (FIG. 3) of body 132 may engage surface 114 of structure 104. In an alternative embodiment, as shown in FIG. 4 (shows details of pin grasping collet 152), where threaded pin remover 120 is not employed in a setting in which extension into structure 104 is necessary, collet engaging sleeve 138 may be omitted and a collet engaging surface 136 may be provided by an end 140 of central opening 134.

Returning to FIG. 2, pin grasper 150 is slidably mounted in housing 130. In the embodiment shown, pin grasper 150 is positioned within central opening 134 of housing 130. Pin grasper 150 may include a first end 154 configured to couple to a linear actuator 156 for slidably moving pin grasper 150 between an extended position (FIGS. 2 and 7) relative to housing 130 and a retracted position (FIG. 8) relative to housing 130. As illustrated, linear actuator 156 includes a cylinder and piston arrangement, e.g., a hydraulic cylinder, having a ram 158 coupled to first end 154 of pin grasper 150. However, linear actuator 156 may include any now known or later developed actuator capable of linearly moving an element such as but not limited to: a hydraulic ram or a pneumatic ram. Ram 158 is shown threadably coupled to first end 154 of pin grasper 150, but other coupling mechanisms may be employed, e.g., a chuck, a set screw arrangement, permanent fastening such as welding, etc. In an optional embodiment, body 132 of housing 130 may include a linear actuator seat 133 configured to mount the body to a portion of the linear actuator 156. However, seat 133 may not be necessary in all instances.

Figure 7:
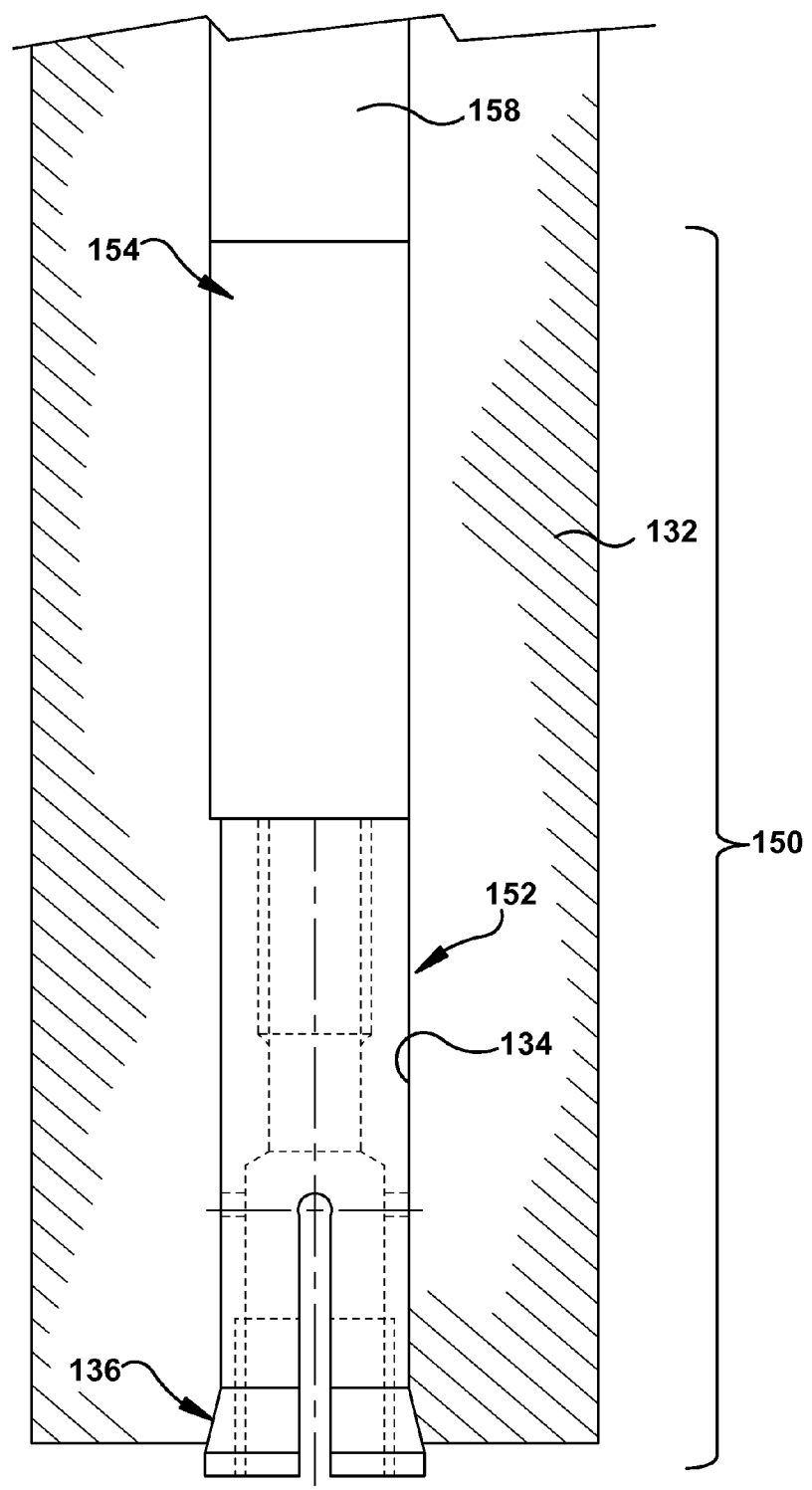
FIG. 7 shows a cross-sectional view of an alternative embodiment of a pin grasper of the threaded pin remover.

Pin grasper 150 may also include a second end 160 including pin grasping collet 152 configured to, in the retracted position (FIG. 8) relative to housing 130, engage with a collet engaging surface 136 of housing 130 to cause grasping of the exposed portion (e.g., proximal end 108 (FIG. 1)) of the threaded pin by the pin grasping collet. As will be described in greater detail herein, as pin grasping collet 152 engages with housing 122, the collet engages proximal end 108 to release threaded pin 100 from the interference fit, allowing removing of the threaded pin from structures 104, 106. As shown in FIG. 7, pin grasper 150, including pin grasping collet 152, may be constructed as a single structure with first end 154 coupled to a ram 158 of a linear actuator. Alternatively, in the embodiment shown in most of the drawings, pin grasper 150 may be segmented to allow for taking it apart, replacing parts and customization through use of different collets 152. The segmentation may take a wide variety of forms. In the one example shown best in FIG. 2, pin grasper 150 may include a connector 157 configured to couple to linear actuator 156, e.g., ram 158 at first end 154, and an adapter 159 coupling connector 157 to pin grasping collet 152. In the embodiment shown, adapter 159 may be threadably coupled to connector 157 and threadably coupled to pin grasping collet 152; however, a wide number of alternative fastening arrangements may be employed such as but not limited to a chuck, a set screw arrangement, etc., for selectively coupling the different segments. Adapter 159 is so labeled as a variety of different adapters may be provided to accommodate different pin grasping collets 152 to accommodate different sized and/or shaped threaded pins 100.

Figure 4:
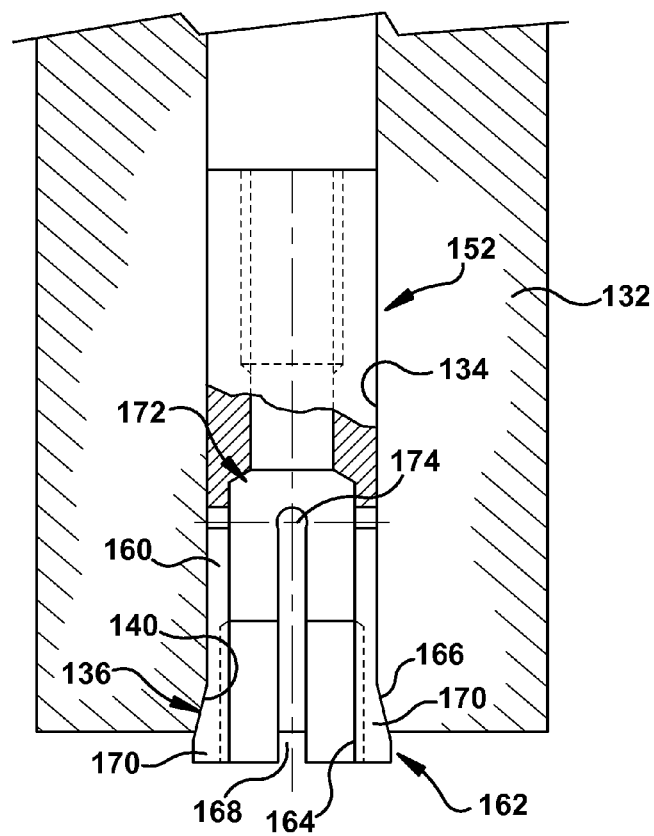
FIG. 4 shows an enlarged cross-sectional view of a pin grasping collet.
Figure 5:
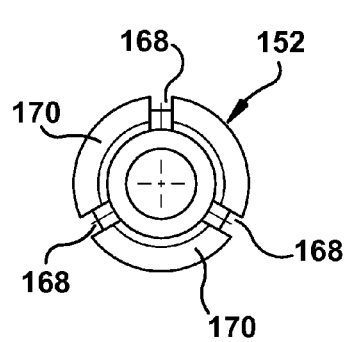
FIGS. 5 and 6 show cross-sectional views of various embodiments of the pin grasping collet of FIG. 4.
Figure 6:
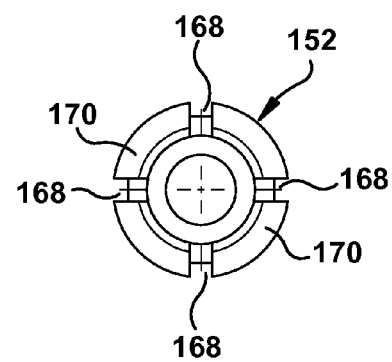

Referring to FIGS. 4-6, various embodiments of pin grasping collet 152 are illustrated. Pin grasping collet 152 may include any holding device that forms a collar around proximal, exposed end 108 of thread pin 100, and holds it by exerting a strong clamping force on it when it is tightened, by means of engagement with collet engaging surface 136 of housing 130. In addition in accordance with embodiments of the invention, collet 152 may be squeezed against collet engaging surface 136 such that its inner surface 164 contracts to a slightly smaller diameter than proximal, exposed end 108, perhaps causing a slight, temporary reduction in diameter of end 108, but releasing the interference fit with opening 112 (FIG. 1) in structure 104.

To this end, in one embodiment shown best in FIG. 4, pin grasping collet 152 may include a sleeve 160 having a distal end 162 including: an inner surface 164 shaped to substantially match an external surface of threaded pin 100, i.e., of proximal, exposed end 108, in a relaxed state. In many cases, inner surface 164 and the external surface of threaded pin 100 are substantially circular in cross-section; however, this is not necessary in all cases. Accordingly, inner surface 164 may have any necessary shape to accommodate proximal, exposed end 108. Sleeve 160 may also include a substantially frusto-conical outer surface 166. Collet engaging surface 136 may have a matching taper to substantially frusto-conical outer surface 166; however, this is not necessary in all instances. The angle of frusto-conical outer surface 166 relative to a longitudinal axis of collet 152 may be user defined based on a number of factors such as but not limited to: the necessary force to grasp threaded pin 100 and release an interference fit with opening 112, the material and/or size of threaded pin 100, etc. In one embodiment, the angle may be between approximately 25° and approximately 45°, e.g., approximately 30°. At least three equally spaced kerf cuts 168 extend radially through distal end 162 creating a number of legs 170. Each leg 170 is flexible, allowing squeezing and changing of the diameter of internal surface 164. As shown in FIG. 4, each kerf cut 168 may extend radially through sleeve 160 from distal end 162 of the sleeve to a medial location 172 of the sleeve. The distance into sleeve 160 may be user selected depending on the necessary clamping force or flex required to grasp or slide over proximal, exposed end 108. Hence, the distance may be based on a large number of parameters such as the size and material of end 108 and/or sleeve 160, the material of structure 104, etc. It is emphasized that any number of kerfs 168 and legs 170 may be employed. For example, FIG. 5 shows a cross-sectional view of a collet having three kerfs 168 and three legs, and FIG. 6 shows a cross-sectional view of a collet having four kerfs 168 and four legs 170. In addition, each kerf cut 168 may optionally include a rounded pressure relief element 174 at medial location 172 of the sleeve to prevent breakage of the sleeve that may occur from repetitive use.

Figure 8:
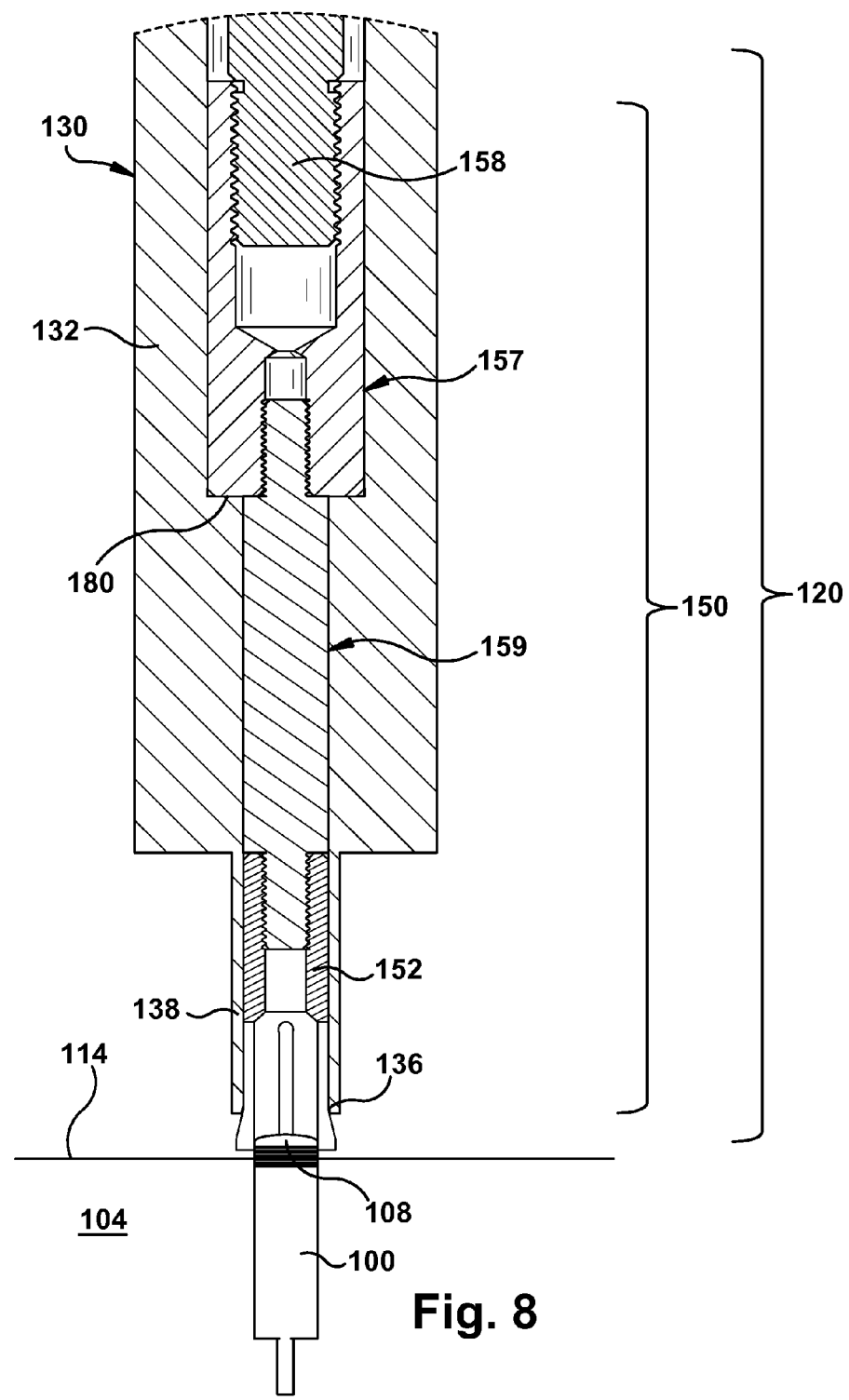
FIGS. 8 and 9 show cross-sectional views of a threaded pin remover in operation.
Figure 9:
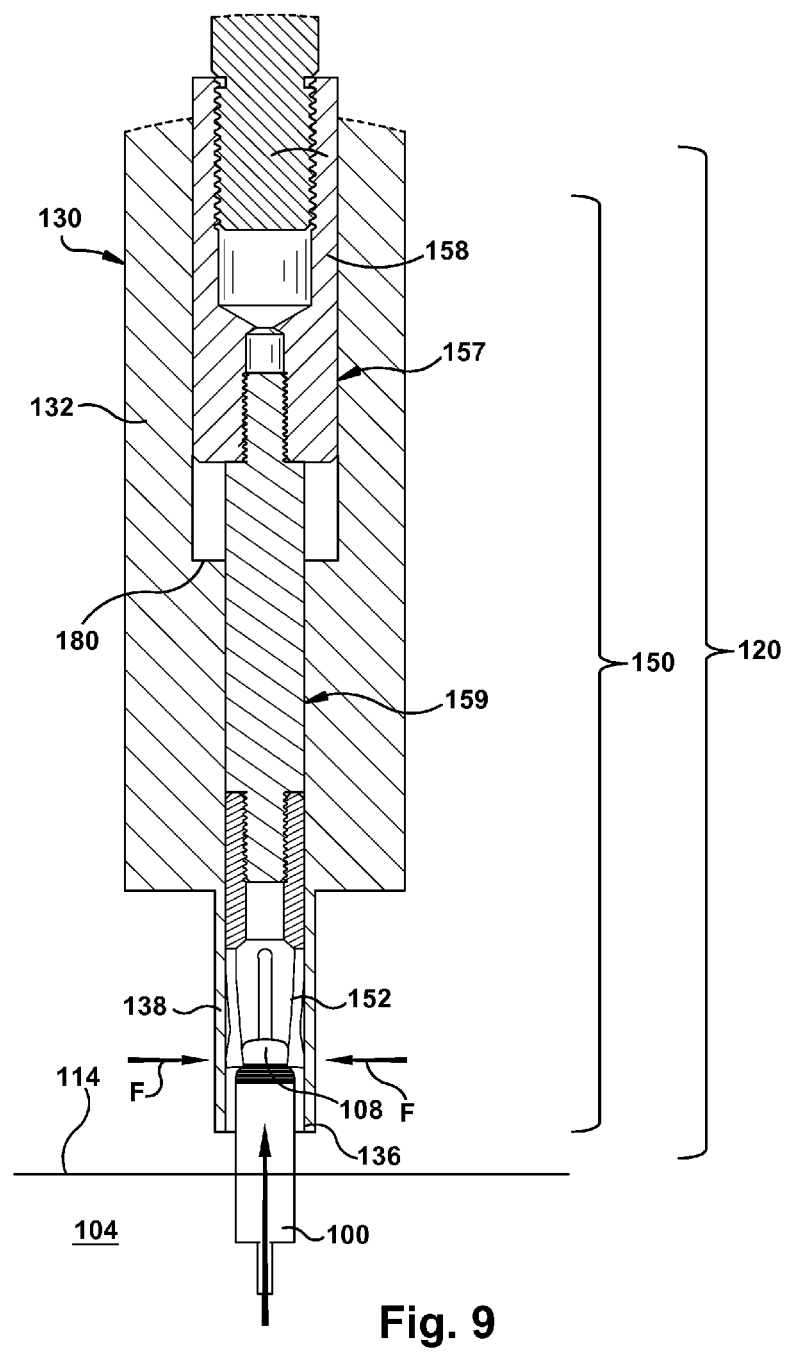

Referring to FIGS. 8 and 9, operation of threaded pin remover 120 will now be described. In FIG. 8, as in FIG. 2, pin grasper 150 is shown in an extended position from housing 130. In this position, pin grasping collet 152 extends slightly from collet engaging surface 136 of housing 130, and in this particular embodiment, from collet engaging sleeve 138. As shown, pin grasping collet 152 is sized to slide over proximal, exposed end 108 of threaded pin 100 in this relaxed state. In some cases, the fit may be slightly tight, but in others, collet 152 may readily slide over end 108. As shown in FIG. 9, as pin grasper 150 moves from the extended position (FIG. 8) to the retracted position (FIG. 9) under influence of the linear actuator, piston grasper 150 and, in particular, pin grasping collet 152, substantially simultaneously grasps proximal, exposed portion 108 of threaded pin 100, releasing the interference fit and longitudinally moves threaded pin 100 relative to structure 104. More specifically, as pin grasping collet 152 is retracted into housing 130, e.g., sleeve 138, collet engaging surface 136 (FIG. 4) engages with frusto-conical outer surface 166 (FIG. 4) of collet 152 causing internal surface 164 to grasp or squeeze proximal, exposed end 108 therein under the influence of the radially inward force created thereby. See force arrows F in in FIG. 9. In the embodiment shown, connector 157 pulls longitudinally away from a surface 180 of central opening 134 of housing body 132. As collet 152 continues to move into housing 130, the force applied by collet 152 onto proximal, exposed end 108 causes a very slight, temporary deformation therein, releasing the interference fit with opening 112 (FIG. 1). As soon as the interference fit is released, threaded pin 100 may slide out of opening 112 (FIG. 1). Complete removal of threaded pin 100 from opening 112 (FIG. 1) can be made by moving threaded pin remover 120 away from structure 104. Alternatively, in one optional embodiment, continued retraction of pin grasper 150 into housing 130 may allow threaded pin 100 to enter housing 130, e.g., sleeve 138; however, as noted, this is not necessary in all settings. While collet 152 may slightly and temporarily deform proximal, exposed end 108, it does not do so to an extent that threaded pin 100 cannot be reused. That is, threaded pin 100 and threaded area 110 can be reused. Consequently, threaded pin remover 120 is capable of saving time in removing threaded pins 100, and savings in cost through reuse of the pins.

While operation has been described relative to the segmented version of pin grasper 150, it is understood that operation is substantially similar for a single-body grasper as illustrated in FIG. 7. In addition, while operation has been described relative to the collet engaging sleeve 138 embodiment, it is understood that operation is substantially similar for housing 130 including a collet engaging surface 136 as illustrated in FIG. 4. Control of the extent of movement of threaded pin remover 120 may be made by linear actuator 156, or, although not shown, by way of various structural stops to limit movement of pin grasper 150. Threaded pin remover 120 and the various parts thereof may be made of any material capable of withstanding the stressed applied thereto, e.g., steel, other metals, or alloys.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A threaded pin remover for a threaded pin in an interference fit in a structure, the threaded pin remover comprising:
    a housing including a collet engaging surface; and
    a pin grasper slidably mounted in the housing, the pin grasper including:
        a first end configured to couple to a linear actuator for slidably moving the pin grasper between an extended position relative to the housing and a retracted position relative to the housing, and
        a second end including a pin grasping collet having a threaded inner surface substantially matching a threaded pitch of the threaded pin, configured to, in the retracted position relative the housing, engage with the collet engaging surface of the housing to cause grasping of the exposed threaded portion of the threaded pin by the threaded inner surface of the pin grasping collet to release the threaded pin from the interference fit, allowing removing of the threaded pin from the structure,
    wherein the pin grasping collet is configured to, in the extended position relative to the housing, form a collar around the exposed end of the threaded pin, and
    wherein the pin grasping collet is configured to, in the retracted position relative the housing, retract completely into the housing, and the threaded inner surface of the pin grasping collet substantially simultaneously grasps the threaded exposed portion of the threaded pin and constricts the collar to a diameter that is smaller than the diameter of the exposed end of the threaded pin, releasing the interference fit and longitudinally moves the threaded pin relative to the structure.

2. The threaded pin remover of claim 1, wherein the pin grasper further includes:
    a connector configured to couple to the linear actuator at the first end; and
    an adapter coupling the connector to the pin grasping collet.

3. The threaded pin remover of claim 2, wherein the adapter is threadably coupled to the connector and threadably coupled to the pin grasping collet.

4. The threaded pin remover of claim 1, wherein the housing includes:
    a body; and
    wherein the collet engaging surface includes a collet engaging sleeve extending from the body and configured to engage an external surface of the pin grasping collet in the retracted position and disengage from the pin grasping collet in the extended position.

5. The threaded pin remover of claim 4, wherein the collet engaging sleeve has a length configured to accommodate a seating distance of the threaded pin relative to a surface of the structure, and wherein, in operation, an end of the body engages the surface of the structure.

6. The threaded pin remover of claim 4, wherein the linear actuator is coupled to the first end of the pin grasper, and wherein the body includes a linear actuator seat configured to mount the body to a portion of the linear actuator.

7. The threaded pin remover of claim 1, wherein the linear actuator is coupled to the first end of the pin grasper.

8. The threaded pin remover of claim 7, wherein the linear actuator is selected from the group consisting of: a hydraulic ram and a pneumatic ram.

9. The threaded pin remover of claim 1, wherein the pin grasping collet includes:
   a sleeve having a distal end having a substantially frusto-conical outer surface; and
   at least three equally spaced kerf cuts extending radially through the distal end.

10. The threaded pin remover of claim 9, wherein each of the kerf cuts extends radially through the sleeve from the distal end of the sleeve to a medial location of the sleeve.

11. The threaded pin remover of claim 10, wherein each of the kerf cuts includes a rounded pressure relief element at the medial location of the sleeve.

12. A threaded pin remover for a threaded pin in an interference fit in a structure, comprising:
   a housing including a body, and a collet engaging sleeve extending from the body;
   a pin grasper slidably mounted in the housing, the pin grasper including:
      a connector configured to couple to a linear actuator for slidably moving the pin grasper between an extended position relative to the housing and a retracted position relative to the housing,
      a pin grasping collet configured to, in the retracted position relative the housing, engage with a portion of the housing to cause grasping of an exposed threaded portion of the threaded pin by the pin grasping collet, wherein the pin grasping collet further includes an inner threaded surface substantially matching a threaded pitch of the threaded pin configured to release the threaded pin from the interference fit, allowing removing of the threaded pin from the structure,
   wherein the pin grasping collet is configured to, in the extended position relative to the housing, form a collar around the exposed threaded portion of the threaded pin, and
   wherein the pin grasping collet is configured to, in the retracted position relative the housing, retract completely into the housing, and an adapter coupling the connector to the pin grasping collet; and
   wherein, as the pin grasper moves from the extended position to the retracted position, the threaded inner surface of the pin grasping collet substantially simultaneously grasps the threaded exposed portion of the threaded pin and constricts the collar to a diameter that is smaller than the diameter of the exposed end of the threaded pin, releasing the interference fit and longitudinally moves the threaded pin relative to the structure.

13. The threaded pin remover of claim 12, wherein the adapter is threadably coupled to the connector and threadably coupled to the pin grasping collet.

14. The threaded pin remover of claim 12, wherein the linear actuator is coupled to the connector, and wherein the body includes a linear actuator seat configured to mount the body to the linear actuator.

15. The threaded pin remover of claim 14, wherein the linear actuator is selected from the group consisting of: a hydraulic ram and a pneumatic ram.

16. The threaded pin remover of claim 12, wherein the pin grasping collet includes:
   a sleeve having a distal end including: a substantially frusto-conical outer surface; and
   at least three equally spaced kerf cuts extending radially through the distal end.

17. The threaded pin remover of claim 16, wherein each of the kerf cuts extends radially through the sleeve from the distal end of the sleeve to a medial location of the sleeve.

18. The threaded pin remover of claim 17, wherein each of the kerf cuts includes a rounded pressure relief element at the medial location of the sleeve.

* * * * *